US005391609A

United States Patent [19]
Knoerzer et al.

[11] Patent Number: 5,391,609
[45] Date of Patent: Feb. 21, 1995

[54] TRANSPARENT FILMS PROVIDING A BARRIER TO THE TRANSMISSION OF ULTRA-VIOLET LIGHT

[75] Inventors: Anthony R. Knoerzer, Fairport; Leland W. Reid, Palmyra, both of N.Y.; Edwin M. Wheeler, LaGrange, Ga.

[73] Assignee: Mobil Oil Corp., Fairfax, Va.

[21] Appl. No.: 253,238

[22] Filed: Jun. 2, 1994

Related U.S. Application Data

[63] Continuation of Ser. No. 72,305, Jun. 9, 1993, abandoned.

[51] Int. Cl.$^6$ ............................ C08K 3/22; C08L 23/16
[52] U.S. Cl. ........................................ 524/497; 525/98; 525/240
[58] Field of Search ................... 524/497; 525/240, 98

[56] References Cited

U.S. PATENT DOCUMENTS

| | | | |
|---|---|---|---|
| 4,419,411 | 12/1983 | Park | 428/516 |
| 4,560,614 | 12/1985 | Park | 428/317.9 |
| 4,590,125 | 5/1986 | Balloni et al. | 428/347 |
| 4,654,249 | 3/1987 | Barbey et al. | 428/148 |
| 4,687,699 | 8/1987 | Hensel et al. | 428/213 |
| 4,693,932 | 9/1987 | Kuze et al. | 428/323 |
| 4,725,466 | 2/1988 | Crass et al. | 428/35 |
| 4,740,421 | 4/1988 | Suzuki et al. | 428/349 |
| 4,741,950 | 5/1988 | Lin et al. | 428/315.5 |
| 4,780,402 | 10/1988 | Remmington | 430/533 |
| 4,827,694 | 5/1989 | Owen | 53/411 |
| 5,055,338 | 10/1991 | Sheth et al. | 428/155 |
| 5,069,962 | 12/1991 | Okazaki et al. | 428/323 |
| 5,215,580 | 6/1993 | Elfenthal et al. | 106/441 |

FOREIGN PATENT DOCUMENTS

| | | |
|---|---|---|
| 1073581 | 3/1980 | Canada . |
| 0393857 | 10/1990 | European Pat. Off. . |
| 3089569 | 4/1988 | Japan . |
| 2242420 | 10/1991 | United Kingdom . |

OTHER PUBLICATIONS

Encycl. of Polym. Sci. and Engineering, J. Wiley & Sons, 1988, vol. 6, pp. 522–531.
Polymer–Polymer Miscibility, O. Olabisi, Academic Press, N.Y., 1979, pp. 340–341.
Roland Winter and Shing Li, *Ultraviolet Stabilizers*, in Modern Plastics Encyclopedia 1985–1986, at 174–176 (McGraw-Hill Publications, New York 1985).

*Primary Examiner*—James J. Seidleck
*Assistant Examiner*—I. Zemel
*Attorney, Agent, or Firm*—Alexander J. McKillop; Malcolm D. Keen; Dennis P. Santini

[57] ABSTRACT

A transparent polymeric film that provides a barrier to the transmission of ultra-violet light. The film results from the addition of titanium dioxide particles having an average particle size less than the wavelength of visible light, yet greater than the wavelength of ultra-violet light, to a polymeric material capable of being formed as a transparent film. More specifically, the titanium dioxide particles have an average size on the order of from about 0.010 $\mu$m to 0.050 $\mu$m and, preferably from about 0.018 $\mu$m to 0.040 $\mu$m.

12 Claims, No Drawings

TRANSPARENT FILMS PROVIDING A BARRIER TO THE TRANSMISSION OF ULTRA-VIOLET LIGHT

This is a continuation of application(s) Ser. No. 08/072,305, filed on Jun. 9, 1993, now abandoned.

BACKGROUND OF THE INVENTION

The present invention relates to polymeric films and, more particularly, to transparent polymeric films that provide a barrier to the transmission of ultra-violet light.

Polymeric films have numerous applications in the prior art. For example, many of these films may be formed such that they are transparent in appearance. Typically, these same films also possess an inherent moisture barrier and, as a result, make an ideal packaging material.

The prior art has previously addressed several problems associated with transparent polymeric films used for packaging. For instance, commonly-owned U.S. Pat. Nos. 4,419,411 and 4,590,125 disclose polypropylene films having low surface coefficients of friction and reduced tendencies to block (i.e., sticking of the film on the film roll), thereby providing improved packaging materials that are well-suited for automated packaging equipment. Commonly-owned U.S. patent application Ser. No. 07/662,661 discloses a film having improved thermal stripe adhesion which addresses the problem associated with heat sealing of polypropylene films.

As mentioned, many of the above-described films are used to package foods and, in particular, snack foods and the like. As is commonly known, snack foods have a limited shelf life. This limited shelf life is believed, in substantial part, to be caused by exposure of the food product to ultra-violet light, which is able to penetrate through the wrapping and contact the product.

Accordingly, by reducing the exposure of food products to ultra-violet light, the shelf life of such products would be increased. In this regard, it would be desirable to provide a transparent polymeric film that protects the food product from exposure to ultra-violet light.

Although the prior art is replete with films and film compositions, nowhere does the prior art disclose a transparent film that provides a barrier to the transmission of ultra-violet light. The prior art, instead, discloses various film compositions that provide a number of other desirable properties, including: (i) reduced film-to-film friction, (ii) reduced blocking, (iii) improved heat sealability, (iv) scratch resistance, (v) improved slipperiness, and (vi) enhanced opacity and brightness.

With respect to enhanced opacity and brightness, an inorganic compound such as titanium dioxide, which serves as a pigment, can be added to the film. This effect is disclosed in commonly-owned U.S. Pat. Nos. 4,560,614 and 4,741,950. The latter reference states that the pigment material, that is, the titanium dioxide, should be of such a size and shape that, when it is added to a polymeric material, it will not significantly contribute to void initiation of the polymer. To one skilled in the art, this would imply that titanium dioxide having an average particle size on the order of from about 0.050 μm (microns) to 0.1 μm be added to the film to produce the desired opacity and brightness effect. Additionally, titanium dioxide may be added to films to fill the voids formed by stretching (i.e., orientation of the film).

Moreover, titanium dioxide is known to have a marginal ultra-violet stabilizing effect when added to polymers in general. For example, in the past, titanium dioxide has been added to milk jugs. This, however, results in a noticeably white product because the titanium dioxide functions as a pigment. With respect to polymeric films, U.S. Pat. No. 4,780,402 states that when titanium dioxide particles having a size on the order of 0.5 μm to 10 μm are added to an opaque polyester film support, the titanium dioxide particle impose a yellowish coloration upon the film and, in addition, absorb ultra-violet light. The '402 titanium dioxide particles, however, are of a "pigment size", thereby rendering the film opaque in appearance and unsuitable for food packaging.

SUMMARY OF THE INVENTION

The present invention, which addresses the problems associated with the prior art, is directed to a transparent film that provides a barrier to the transmission of ultra-violet light. The invention includes a polymeric material capable of being formed as a transparent film. The present invention also includes titanium dioxide particles having an average particle size less than the wavelength of visible light, yet greater than the wavelength of ultra-violet light and in an amount sufficient to reduce the transmission of ultra-violet light through the film.

In a preferred embodiment of the present invention, the percentage by weight of the titanium dioxide particles is from about 0.0% to 3.0% and, preferably from about 0.5% to 1.5% and the average particle size of the titanium dioxide is from about 0.010 μm to 0.050 μm and, preferably from about 0.018 μm to 0.040 μm.

The present invention is also directed to a method for reducing the transmission of ultra-violet light through a transparent polymeric film. The method is accomplished by adding titanium dioxide having an average particle size less than the wavelength of visible light, yet greater than the wavelength of ultra-violet light, to a polymeric material. In a preferred embodiment, the titanium dioxide particles have an average particle size on the order of from about 0.010μ to 0.050 μm and, preferably from about 0.018 μm to 0.040 μm. The mixture is then formed as a film.

In a preferred embodiment, the titanium dioxide is added to a first polymeric material to provide a master batch. The master batch is then added to a second polymeric material to provide an extrudable/orientable grade of resin. Finally, the extrudable/orientable resin is formed as a film.

As a result of the present invention, a transparent polymeric film may be produced that is suitable for food packaging (i.e., it is transparent in mixture) yet, at the same time, provides a barrier to the transmission of ultra-violet light. It is believed that reducing the exposure of food products to ultra-violet light will increase the shelf life of such products.

DETAILED DESCRIPTION OF THE INVENTION

It has been discovered that when titanium dioxide ($TiO_2$) having an average particle size less than the wavelength of visible light, yet greater than the wavelength of ultra-violet light, is added to a polymeric material to be formed as a transparent film, the resultant film provides a barrier to the transmission of ultra-violet light.

As previously described, $TiO_2$ has been added to films of the prior art for enhanced opacity and brightness. In other words, in the films of the prior art the $TiO_2$ functioned as a pigment. These films, however, are opaque in appearance and, accordingly, are unsuitable for food packaging.

In contrast, the present invention disperses $TiO_2$ particles in a polymeric material capable of being formed as a transparent film. The $TiO_2$ particles have an average particle size on the order of from about 0.010 $\mu$m to 0.050 $\mu$m and, more preferably, on the order of from about 0.018 $\mu$m to 0.040 $\mu$m. If the particle size decreases any further, the $TiO_2$ becomes ineffective, while, if the particle size becomes too great, the $TiO_2$ begins to function as a pigment, thereby greatly reducing the transparency of the film.

The film of the present invention may have anywhere from 1–5 layers. $TiO_2$ particles may be dispersed in any number of those layers. Additionally, the film of the present invention may be stretched, either mono-axially or bi-axially. Similarly, the invention works equally well in films that are not stretched, i.e., cast films. Contrary to what might be thought, cast films may still be transparent. More particularly, a film that is not going to be stretched is cast with an already reduced thickness (e.g., 1/40 the thickness of a film that would normally be stretched) and, hence, appears transparent.

The percentage of $TiO_2$ added to the film influences the haze of the film. Specifically, the haze of the film increases with the addition of $TiO_2$. In the present invention, films having a relatively high percentage of $TiO_2$ by weight (e.g., 3% to 10%) and also having a relatively low haze factor have been formed by reducing the film thickness (reducing the thickness from, for example, 100 gauge to 50 gauge).

It is believed that any orientable resin, including polyolefins, polyesters and nylons, may be employed with the present invention. More specifically, as long as the resultant film produced from the resin is not cavitated (i.e., containing numerous cavities that defract light and give the film a "whitish" appearance), the resin is suitable for use in the present invention. The present invention may also employ a terpolymer such as a combination of ethylene, propylene and butylene. Additionally, it may employ copolymers of ethylene and propylene or like combinations of polyolefins.

In a preferred embodiment of the present invention, $TiO_2$ particles are dispersed in a first polymer material, for example, a copolymer of ethylene and propylene, the ethylene having a percentage by weight of anywhere from 3% to 10%, all the way to about 100%. The ethylene binds with the $TiO_2$ and causes it to disperse in the copolymer. (This first step forms what is referred to as a master batch, the master batch having a large concentration of $TiO_2$ by weight). Next, a select amount of the master batch is added to a second polymeric material, such as polyethylene or polypropylene (e.g., one pound of the master batch may be added to 10 pounds of the second polymeric material). The resultant composition is then formed as a film. Of course, as is known in the art, the first and second polymeric materials must be compatible with one another.

The percentage of ethylene required for the first step depends on the amount of $TiO_2$ being added to the copolymer. The more $TiO_2$ to be added, the more ethylene required for dispersion. Adding a large amount of $TiO_2$ to the copolymer, results in a master batch with a high concentration of $TiO_2$. It naturally follows, then, that less of this master batch (i.e., that with a high concentration of $TiO_2$) will need to be added to the designated second polymeric material to form a film having a desired quantity of $TiO_2$.

EXAMPLES

Four film structures were produced for each example; each one mil thick with various loadings of $TiO_2$. The table below shows the percentage of ultra-violet light (having a wavelength on the order of 200 nm to 400 nm) transmitted through the film for each loading of $TiO_2$. The table also shows the corresponding ASTM haze data for each loading of $TiO_2$ (haze increases with increasing number).

EXAMPLE 1

| haze Sample | % by weight $TiO_2$ | % UV light transmitted through film | ASTM of film |
|---|---|---|---|
| 1 | 0 | ~60% | 1.5 |
| 2 | .5 | ~18% | 8.0 |
| 3 | 1.0 | ~15% | 17.0 |
| 4 | 1.5 | ~6% | 24.0 |

This film contained 2% ethylene.

EXAMPLE 2

| haze Sample | % by weight $TiO_2$ | % UV light transmitted through film | ASTM of film |
|---|---|---|---|
| 5 | 0 | ~60% | 1.8 |
| 6 | 1 | ~15% | 4.0 |
| 7 | 2 | ~6% | 14.0 |
| 8 | 3 | ~5% | 21.0 |

This film contained 1% ethylene.

It is readily apparent that the percentage of ultra-violet light passing through the film decreases as the percentage by weight of $TiO_2$ added to the film increases. However, as shown above, the addition of $TiO_2$ to the film also increases the haze of the film. It is, therefore, necessary to balance the reduction of ultra-violet light against the increase in haze of the film.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for manufacturing a transparent polymeric film providing a barrier to the transmission of ultra-violet light comprising:

adding titanium dioxide having an average particle size less than the wavelength of visible light and greater than the wavelength of ultra-violet light to a copolymer of ethylene and propylene to provide a masterbatch;

mixing said masterbatch with a homopolymer of polypropylene to provide an extrudable resin; and forming said extrudable resin as a transparent film.

2. The method according to claim 1, wherein the average particle size of said titanium dioxide is from about 0.010 $\mu$m to 0.050 $\mu$m.

3. The method according to claim 2, wherein the average particle size of said titanium dioxide is from about 0.018 $\mu$m to 0.040 $\mu$m.

4. The method according to claim 1, wherein the percentage by weight of said titanium dioxide is up to about 3.0%.

5. The method according to claim 4, wherein the percentage by weight of said titanium dioxide is from about 0.1% to 1.5%.

6. The method according to claim 1, wherein said copolymer includes from about 3% to about 10% by weight of ethylene.

7. A transparent polymeric film structure providing a barrier to the transmission of ultra-violet light produced by the process comprising:

adding titanium dioxide having an average particle size less than the wavelength of visible light and greater than the wavelength of ultra-violet light to a copolymer of ethylene and propylene to provide a masterbatch;

mixing said masterbatch with a homopolymer of polypropylene to provide an extrudable resin; and forming said extrudable resin as a transparent film.

8. The film according to claim 7, wherein the average particle size of said titanium dioxide is from about 0.010 $\mu$m to 0.050 $\mu$m.

9. The film according to claim 8, wherein the average particle size of said titanium dioxide is from about 0.018 $\mu$m to 0.040 $\mu$m.

10. The film according to claim 7, wherein the percentage by weight of said titanium dioxide is up to about 3.0%.

11. The film according to claim 10, wherein the percentage by weight of said titanium dioxide is from about 0.1% to 1.5%.

12. The film according to claim 7, wherein said copolymer includes from about 3% to about 10% by weight of ethylene.

* * * * *